3,488,220
BIPOLAR BATTERY CONSTRUCTION AND
ELECTRODES THEREFOR
Arthur E. Lyall, Bridgewater, and Steven Charlip,
Edison, N.J., assignors to Gulton Industries, Inc.,
Metuchen, N.J., a corporation of New Jersey
Filed Dec. 13, 1967, Ser. No. 690,339
Int. Cl. H01m 39/06
U.S. Cl. 136—10                             8 Claims

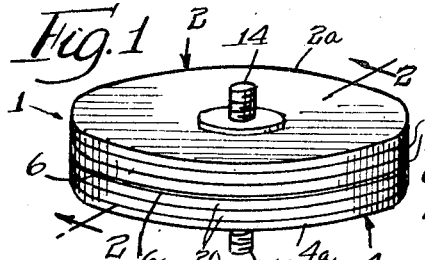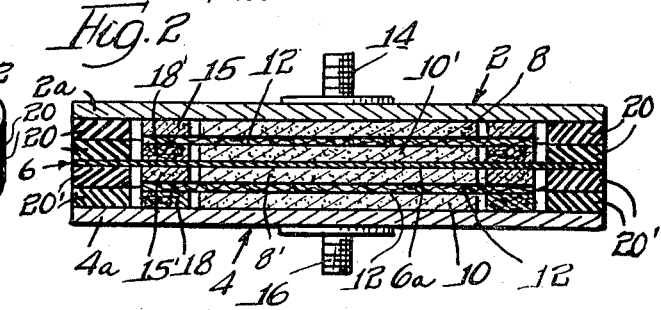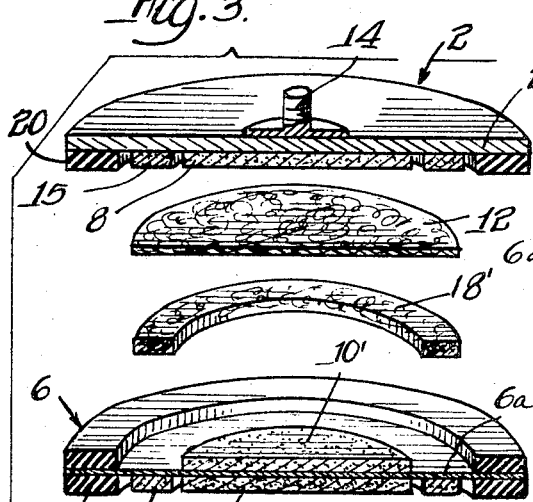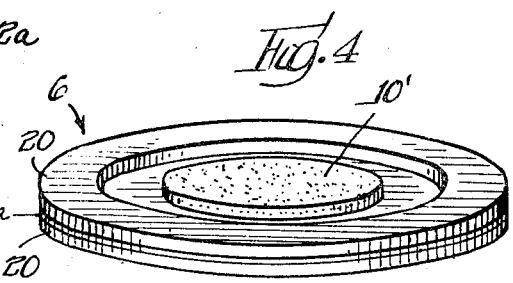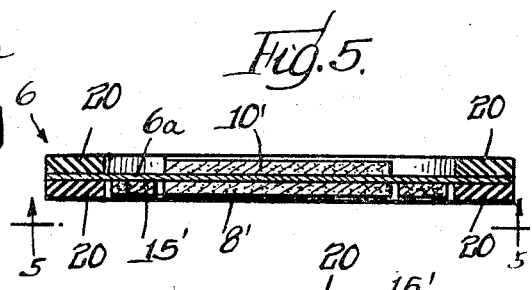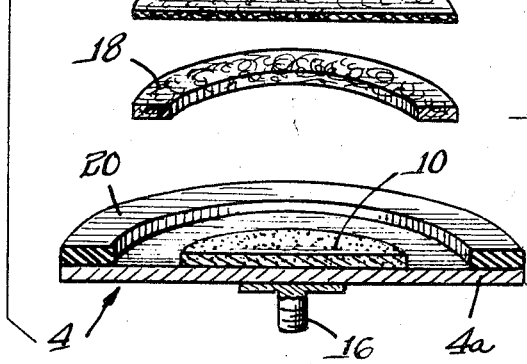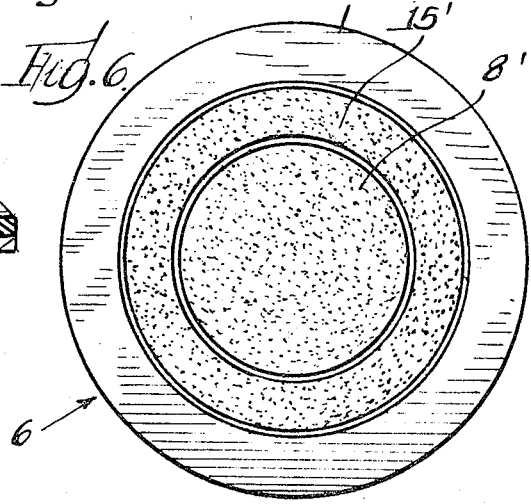
Inventors
Arthur E. Lyall
Steven Charlip
By: Wallenstein, Spangenberg, Hattis & Strampel attys United States Patent Office 3,488,220
Patented Jan. 6, 1970

ABSTRACT OF THE DISCLOSURE

A bipolar battery comprises a stack of electrode elements sealed together at the peripheries thereof and being in closely spaced relation and separated by layers of electrolyte impregnated material. The stack comprises at least one inner bipolar electrode element comprising a carrier plate having porous layers of metal on corresponding areas on opposite sides of said carrier plate which are respectively impregnated with positive and negative active material so there is a positive battery electrode formed on one side of the carrier plate and a negative battery electrode on the opposite side of the carrier plate. Each outermost electrode element in the stack comprises a carrier plate having a porous layer of metal thereon which is impregnated with positive or negative active material and is located opposite the negative or positive electrode of the adjacent inner bipolar electrode element. Each electrode element with a negative electrode on one side thereof has on this side an oxygen consuming electrode thereon comprising a layer of porous metal which is substantially free of all positive and negative active material, each oxygen consuming electrode being spaced from the associated negative electrode in the associated carrier plate and electrically connected thereto through a low impedance path including the carrier plate which carries the same.

---

This invention relates to improvements in sealed rechargeable bipolar batteries. A bipolar battery is a battery made of a stack of electrode elements sealed at their peripheries with electrolyte impregnated layers of material located between the electrode elements. Each inner electrode element of the battery comprises an imperforate support plate having a positive battery electrode on one side thereof which forms the positive plate of one cell of the battery, and having a negative battery electrode on the other side thereof forming the negative plate of another cell of the battery. The electrode elements are so closely spaced in the stack that there is very little space therebetween. The support plate of each electrode element acts as an intercell connector so that very low intercell resistance is achieved. Consequently, these batteries are capable of delivering unusually high currents at rated voltages for short intervals in such applications, for example, as power supplies for pulsing lasers and as auxiliary batteries for use in accelerating electric motors used in electric battery operated vehicles.

For most short duration high current applications, it is frequently highly desirable to recharge a bipolar battery in the shortest possible time. Most rechargeable bipolar batteries are sealed batteries with nickel and cadmium as the active positive and negative materials and wherein oxygen is generated at the positive nickel plates during charge and overcharge thereof. A nickel-cadmium battery is considered to be fully charged when the divalent nickel-hydroxide of the positive battery electrodes is oxidized to trivalent nickel-hydroxide. During charging of the battery, the cadmium-hydroxide of the negative battery electrodes is reduced to metallic cadmium. Generally, an excess amount of cadmium-hydroxide is utilized so that, after the divalent nickel-hydroxide is fully oxidized, some cadmium-hydroxide remains during the overcharge period. During this overcharge period, the rate of oxygen generation markedly increases. This oxygen must be consumed to avoid a dangerous build-up of pressure in the battery. At relatively low charge rates, all the oxygen which is generated normally can be readily absorbed at the negative plates where the oxygen reacts with water to form hydroxide ions replenishing the hydroxide ions of the electrolyte consumed at the positive plates. The problem of oxygen consumption in bipolar rechargeable batteries has, thus, required such low charge rates that it has often taken as much as ten hours to recharge the bipolar batteries.

The present invention provides a unique electrode element construction which provides a separate highly efficient oxygen consuming electrode as an integral part of each electrode element carrying a negative battery electrode (i.e. each inner bipolar electrode element and one of the outermost electrode elements of the stack). With the construction, location and arrangement of the oxygen consuming electrodes in the bipolar battery of the invention, a remarkable increase in the oxygen consuming ability of the battery is achieved with a minimum space requirement and at a minimum cost. Bipolar batteries incorporating the present invention have been fully recharged in only one to two hours instead of the ten hours previously required.

Bipolar battery electrode elements have been constructed with the positive and negative battery electrodes thereof formed by sintering layers of nickel or other suitable material onto the carrier plates. The layer of porous material of an electrode element which is to form a positive electrode in a nickel-cadmium alkaline battery is impregnated with a nickel salt solution, such as a hexammonium nickel acetate solution and the layer of porous material of an electrode element which is to form a negative electrode therein is impregnated with a cadmium salt solution, such a cadmium nitrate solution. After impregnation, the nickel and cadmium salts are converted to nickel and cadmium hydroxide by immersion in potassium hydroxide. The hydroxides are subsequently activated by a well known technique which involves the repeated charging and discharging of the electrode elements.

In accordance with the present invention, the side of each electrode element which contains a negative battery electrode is provided with an oxygen consuming electrode comprising a layer of porous metal having oxygen consuming properties, such as nickel in the nickel-cadmium battery referred to, positioned preferably in contiguous but necessarily in spaced relation to the layer of porous material forming the negative battery electrode. The layers of porous material forming the oxygen consuming electrode and the negative battery electrode are sintered on spaced areas of the carrier plate involved, one area preferably being in the central region of the carrier plate and the other preferably being in an annular band spaced around the central area. The layer of porous material forming the oxygen consuming electrode is substantially free of all positive and negative active material so substantially all of the surfaces of the porous material is available for oxygen consumption. These layers of material forming the negative battery electrode and the oxygen consuming electrode on each carrier plate are preferably of the same thickness, and the electrolyte is applied to the electrodes involved by a common layer of electrolyte impregnated material which is sandwiched between the electrode element involved and the adjacent electrode element.

During charge or overcharge of the battery, as previously indicated, water is generated at the positive battery electrodes which exudes therefrom. This water can collect on the layers of porous material forming the oxygen consuming electrodes of the cell involved and thereby flood the same to render it ineffective for oxygen consumption due to the interference by the water to the electrode. In accordance with another aspect of the invention, the portion of the side of each carrier plate having a positive battery electrode which is opposite that portion of the carrier plate of the adjacent electrode element which is occupied by an oxygen consuming electrode is left free of any porous material, and the space which is left thereby is filled with a normally unwetted body of water absorbant material, so that there is a sump provided for the water which is generated during the charging of the battery.

The above and other advantages and features of the invention will become apparent upon making reference to the specification to follow, the claims and the drawings wherein:

FIG. 1 is a perspective view of a bipolar battery which incorporates features of the present invention;

FIG. 2 is a longitudinal sectional view through the bipolar battery of FIG. 1, taken substantially along the section line 2—2 thereof;

FIG. 3 is an exploded view of parts making up the bipolar battery of FIGS. 1 and 2;

FIG. 4 is a perspective view of the inner bipolar electrode element of the battery of FIGS. 1 through 3;

FIG. 5 is a vertical sectional view through the bipolar electrode element shown in FIG. 4; and FIG. 6 is a bottom plan view of the bipolar electrode element shown in FIG. 5.

The bipolar battery illustrated in the drawings and identified by reference numeral 1 has an overall cylindrical shape and comprises a stack of electrode elements 2, 4, and 6 sealed together at their peripheries to form a completely sealed bipolar battery. (Although less preferred, the battery could have a rectangular cross section.) The battery 1 may comprise any number of electrode elements, depending upon the voltage requirements of the battery 3. The battery illustrated is a two-cell battery where one of the cells is formed by one of the outer electrode elements 2 and an inner bipolar electrode element 6 and the other cell is formed between the other outer electrode element 4 and the inner bipolar electrode element 6.

In the most preferred form of the invention, each electrode element 2, 4, 6, etc. forms a separate integral assembly which is combined with the other electrode elements to form a complete battery preferably by simply adhesively securing the electrode elements together at the peripheries thereof, with bodies or layers of electrolyte impregnated material 12 and water absorbant material 18–18' sandwiched therebetween. However, it should be understood that the electrode elements could be interconnected and sealed at their peripheries in other ways, such as by encapsulating the same or using separate sealing rings therebetween and clamping the same together. The use of encapsulation and separate sealing rings are decidedly inferior to the manner in which the electrode elements are sealed in the most preferred form of the invention to be described, which is a development of other inventors which does not constitute any part of the present invention.

One of the outer electrode elements 2 carries on the inner side thereof a negative battery electrode 8 and the outer electrode element 4 carries on the inner side thereof a positive battery electrode 10. The negative battery electrode 8 confronts the positive battery electrode 10' of the adjacent inner bipolar element 6 (which constitutes the only inner electrode element in the embodiment of the invention illustrated). The positive battery electrodes 10 of the outer electrode element 4 confronts the battery electrode 8' carried on the bipolar electrode element 6. The layer of electrolyte impregnated material 12 separate the confronting positive and negative battery electrodes.

The electrical innerconnections between the cells of the bipolar battery are imperforate plate members, referred to as carrier plates, the carrier plates for the outer electrode elements 2 and 4 being identified by reference numerals 2a and 4a, respectively, and the carrier plate for the inner bipolar electrode element 6 being identified by reference numerals 6a.

The carrier plates 2a and 4a of the outer electrode elements are made sufficiently thick and rigid to provide mechanical strength for the battery and prevent bulging of the battery. Thus, for example, the carrier plates 2a and 4a may have a thickness of the order of 20 mils and greater. As illustrated, the carrier plates 2a and 4a have secured thereto screw terminals 14 and 16, respectively. The metal out of which each of the carrier plates are made in a nickel-cadmium battery is preferably nickel. To provide a battery of minimum weight, the carrier plate of each inner bipolar electrode element carrier is a thin plate or foil. The thinnest carrier plate found reliable was a three mil thick nickel sheet.

The negative and positive battery electrodes 8' and 10' on the bipolar electrode element 6 are formed by sintering nickel particles onto the center regions of the opposite sides of the carrier plate 6a and, as previously explained, impregnating the same with cadmium and nickel salts and then converting the same to cadmium and nickel hydroxide. The thickness of the sintered nickel layers forming the positive and negative battery electrodes 8, 8', 10 and 10' is a function of the capacity or the discharge rate of the battery involved. Where capacity requirements are small, thinner layers of sintered material will be used with corresponding thinner layers of active material impregnated within the sintered material. For higher capacities, thicker bodies of sintered material are used with correspondingly thicker layers of active material. For example, porous nickel layers of about 20 to 30 mils thick have been used on the carrier plates. The porosity of the layers of sintered material is desirably about 80–85%. In the case where the nickel is sintered to opposite sides of a carrier plate, the first layer is sintered on one side of the carrier plate at a lower temperature (e.g. 1700 degrees F.) and the second layer is sintered to the other side of the carrier plate at a higher temperature (e.g. 1875 degrees F.) to attain uniform porosity on both sides. The lower temperature is used for the first layer to compensate for the double temperature exposure thereof.

In accordance with the present invention, instead of applying the positive and negative battery electrodes over substantially the entire exposed surface area of each carrier plate, these electrodes are applied over only a limited portion of the exposed area of the carrier plates and most of the remainder of the surface area on the side of each carrier plate carrying a negative battery electrode is supplied with a porous oxygen consuming electrode, free of all active positive and negative materials, the electrode on the outer carrier plate 2a being identified by reference numeral 15 and on the inner carrier plate 6a by reference numeral 15'. Where the battery electrodes 8, 8', 10 and 10' are in the center region of the associated carrier plates; each oxygen consuming electrode 18 or 18' occupies an annular band spaced around the associated negative battery electrode. Nickel is an excellent oxygen consuming electrode material for a nickel-cadmium battery, and so the annular oxygen consuming electrodes are layers of porous nickel sintered upon the sides of the carrier plates 2a and 6a containing the negative battery electrodes 8 and 8'. It is of utmost importance that the adjacent porous oxygen consuming and negative battery electrodes on a carrier plate be separated so that there can be no migration of any of the active materials within the negative battery electrode to the oxygen consuming electrode. If these porous electrodes contact, capillary action would readily cause such migration. For best results, each oxygen consuming electrode should be at the same potential as that of the negative electrode, which is effected through the low impedance connection thereto through the carrier plate carrying the same.

The layers of porous material forming the oxygen consuming electrodes 15 and 15' are most advantageously of the same thickness as the associated negative battery electrodes 8 and 8', so the associated layers of the electrolyte impregnated material 12 sandwiched between the pairs of electrode elements will contact the exposed surface areas of the oxygen consuming electrodes and the battery electrodes.

The layers 12 of electrolyte impregnated material may be made of porous nylon film having a thickness of the order of magnitude of about 10 mils and saturated with a 34% solution of potassium hydroxide.

As previously indicated, during the charge and overcharge of the battery 1, water is generated at the positive battery electrodes which water must be kept from accumulating on the oxygen consuming electrodes 15 and 15'. To this end, the side of each carrier plate carrying a positive battery electrode 10 or 10' is kept void of any layers of porous material in the region corresponding to the portion occupied by an oxygen consuming electrode on the negative battery electrode carrying side of a carrier plate and the space left between this portion of the carrier plate and the adjacent layer of electrolyte impregnated material 12 is filled with a body 18 or 18' of initially unwetted water absorbent material, such as a porous nylon like that used in the layers 12 of electrolyte impregnated material. These bodies of initially unwetted water absorbent material acts as a sump for the water generated in the positive battery electrodes 10 and 10'.

The peripheral portion of the side of each electrode element 2, 4, and 6 which confronts another electrode element has secured thereto an annular sealing ring 20 preferably made of neoprene. The desired thickness of each gasket 20 is approximately equal to the sum of the thickness of the associated electrode layers and one half the thickness of the associated layer 12 of electrolyte impregnated material. It has been found extremely difficult to seal materials like neoprene to metal surfaces such as nickel so that they seal against the passage of alkaline electrolytes like potassium hydroxide. Thus, rubber-based adhesives applied between rubber gaskets and nickel metal surfaces are ineffective for this purpose when applied in the manner of the prior art. The problem of sealing neoprene to metal surfaces like nickel has been solved by the discovery of a unique process which involves first applying an uncured rubber-base adhesive to the metal surface, heating the adhesive to partially cure the same, and then molding a body of uncured neoprene free of fillers, whiteners and vulcanizers against the partially cured adhesive by application of heat and pressure which completely cure the adhesive and neoprene. A particularly good adhesive for this purpose is a rubber based adhesive manufactured by the Hughson Chemical Company, Division of Lord Corporation, Erie, Pa. 16512, under the trademark Chemlock 220. The electrode elements 2, 4 and 6 are sealed together by a rubber-based adhesive which adhesively secures the neoprene gaskets 20 thereof.

In manufacturing bipolar batteries in accordance with the present invention, nickel-cadmium bipolar batteries having approximately 160 square inches of battery surface area per cell have been constructed which are capable of delivering 24 ampere hours of energy with charge periods of only 1 to 2 hours as compared to approximately 10 hours in similar bipolar batteries constructed in accordance with the prior art.

It should be understood that numerous modifications may be made in the most preferred form of the invention described above without deviating from the broader aspects thereof.

We claim:

1. A bipolar battery including a bipolar electrode element comprising: an imperforate conductive carrier plate having on corresponding areas on the opposite sides thereof layers of porous material respectively impregnated with positive and negative active material wherein said layers of impregnated material on the opposite sides of the carrier plate respectively form positive and negative battery electrodes and an oxygen consuming electrode on the side of the carrier plate containing the negative battery electrode and comprising a porous layer of oxygen consuming material physically spaced from the negative battery electrode but electrically connected thereto through a low impedance path including said carrier plate, said porous layer of oxygen consuming material being free of all positive and negative active materials so substantially all of the surface area thereof is available for oxygen consumption.

2. The battery of claim 1 wherein the positive battery electrode on one side of the carrier plate is a single integral body of porous material impregnated with said positive active material, the negative battery electrode on the other side of the electrode plate is a single integral body of porous material impregnated with said negative active material, and said oxygen consuming electrode is a single integral body of porous material.

3. The battery of claim 2 wherein the porous integral bodies of material forming said negative electrode and said oxygen consuming electrode are of the same thickness, so the outermost surfaces thereof are in a common plane.

4. The battery of claim 2 wherein one of said porous integral bodies on the side of the carrier plate carrying the negative battery electrode is in the center region of the carrier plate and the other of same extends around said one porous integral body.

5. A bipolar battery comprising: a stack of bipolar electrode elements sealed together at the peripheries thereof, said bipolar electrode elements being in closely spaced relation and separated by layers of electrolyte impregnated material which supplies electrolyte to the electrode elements, there being at least one internal bipolar electrode elements comprising a metal carrier plate extending transversely of the stack and having porous layers of conductive material on corresponding areas on opposite sides of said carrier plate which are respectively impregnated with positive and negative active material so there is a positive battery electrode formed on one side of the carrier plate and a negative battery electrode on the opposite side of the carrier plate, one of the outermost bipolar electrode elements in the stack comprising a metal carrier plate extending transversely of the stack and having at least one porous layer of metal thereon which is impregnated with positive active material and is located opposite the negative electrode of the adjacent inner bipolar electrode element, the other outermost bipolar electrode element comprising a metal carrier plate extending transversely of the stack and having at least one porous layer of metal thereon which is impregnated with negative active material and is located opposite the positive electrode of the adjacent inner bipolar electrode element, the side of each bipolar electrode element with a negative electrode thereon having an oxygen consuming electrode thereon comprising a layer of porous metal which consumes free oxygen thereon and which is substantially free of all positive and negative active material so substantially all of the surface area thereof is available for oxygen absorption, each oxygen consuming electrode being spaced from the associated negative electrode on the associated carrier plate and electrically connected thereto through a low impedance path including said carrier plate, and a layer of electrolyte impregnated material adjacent each oxygen consuming electrode which layer of material carries electrolyte thereto.

6. The bipolar battery of claim 5 wherein the layers of porous material on the same side of each bipolar electrode element forming the oxygen consuming and negative battery electrodes are of the same thickness and the aforesaid layers of electrolyte impregnated material which carry electrolyte to the oxygen consuming and negative battery electrodes of a bipolar electrode element being the same layer of material extending into contact with both electrodes.

7. The bipolar battery of claim 5 wherein water is produced at the positive battery electrodes as a result of charge and overcharge of the battery which cannot be absorbed by the battery electrodes and electrolyte impregnated material, the battery being provided with initially unwetted bodies of water absorbant material adjacent each positive battery electrode to absorb said water.

8. The bipolar battery of claim 5 wherein water is produced at the positive battery electrodes as a result of charge and overcharge of the battery which cannot be absorbed by the battery electrodes and electrolyte impregnated material, the areas on the sides of the carrier plates carrying the positive battery electrodes corresponding to the areas of the other sides thereof occupied by the oxygen consuming electrodes is devoid of electrodes, and there is provided bodies of initially unwetted water absorbant material located in the spaces adjacent said electrodeless areas of the carrier plates which bodies of absorbant material absorb water produced at the positive electrode as a result of the charge and overcharge of the battery.

References Cited

UNITED STATES PATENTS

| | | | |
|---|---|---|---|
| 3,123,504 | 3/1964 | Schilke | 136—10 XR |
| 3,156,586 | 11/1964 | Solomon et al. | 136—100 |
| 3,207,631 | 9/1965 | Zaromb | 136—10 |
| 3,390,014 | 6/1968 | Eisler | 136—6 |

WINSTON A. DOUGLAS, Primary Examiner

A. SKAPARS, Assistant Examiner

U.S. Cl. X.R.

136—3, 6